May 19, 1959     A. B. WEST     2,887,343
LATERALLY INFLEXIBLE ENDLESS TRACK
Original Filed Sept. 23, 1955     2 Sheets-Sheet 1
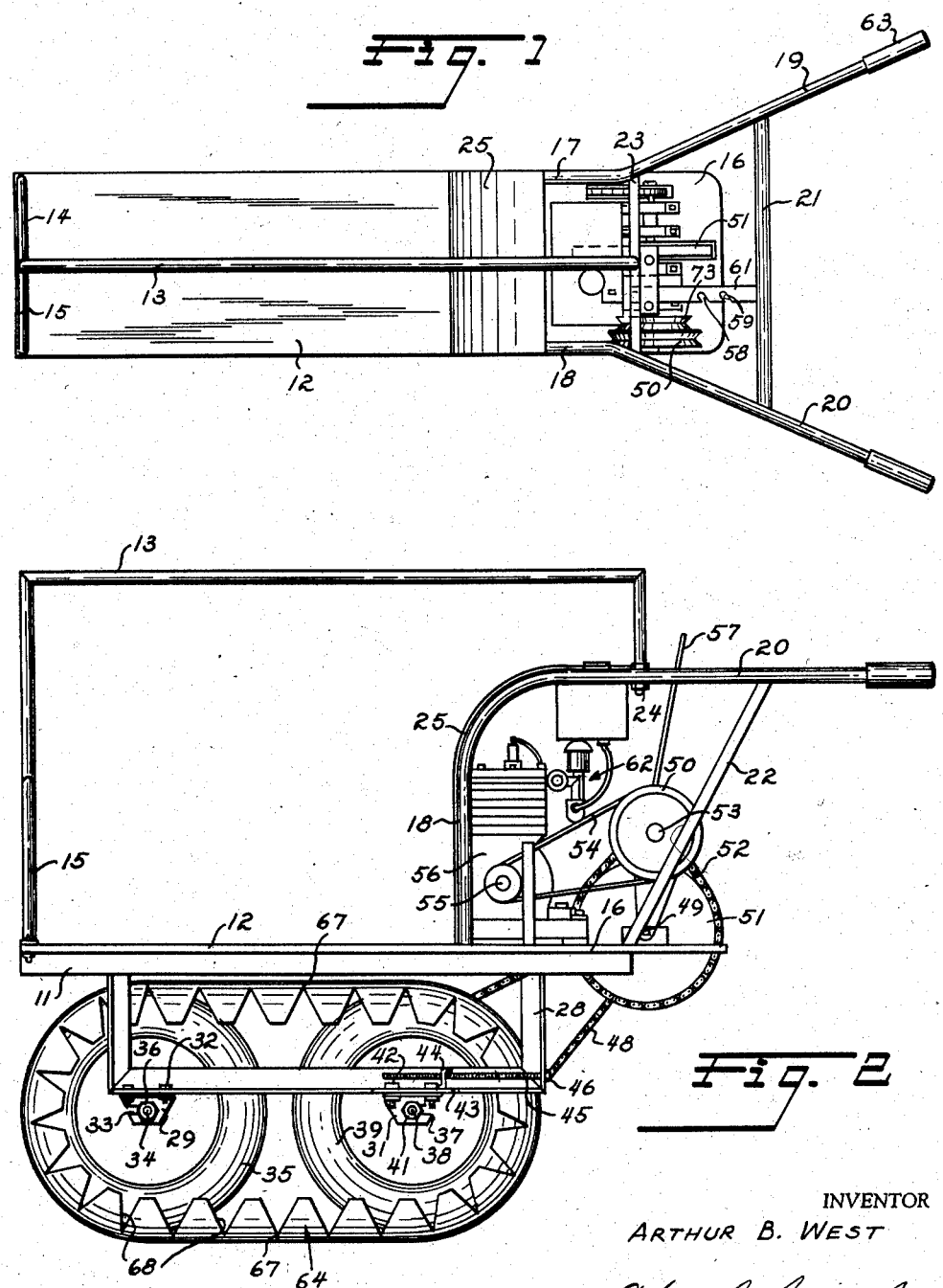
INVENTOR
ARTHUR B. WEST
ATTORNEYS May 19, 1959     A. B. WEST     2,887,343
LATERALLY INFLEXIBLE ENDLESS TRACK
Original Filed Sept. 23, 1955     2 Sheets-Sheet 2
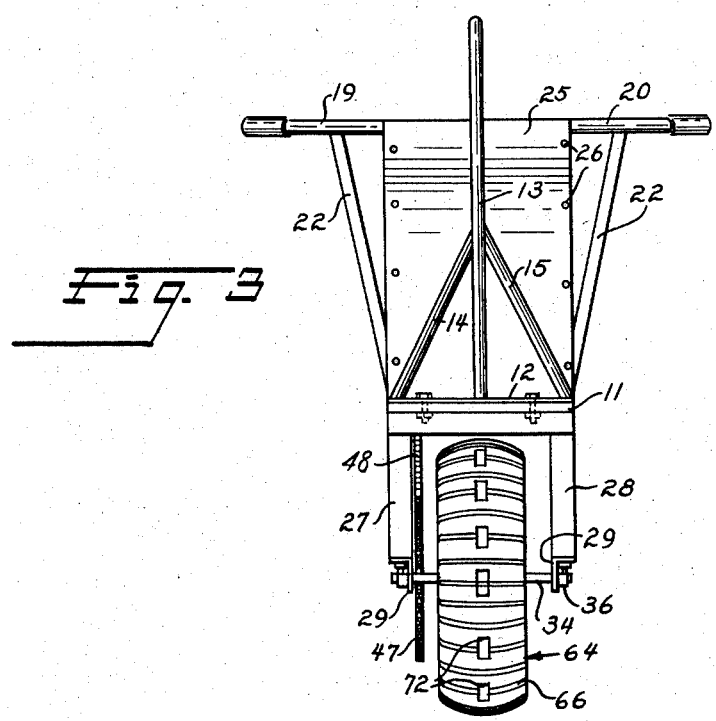
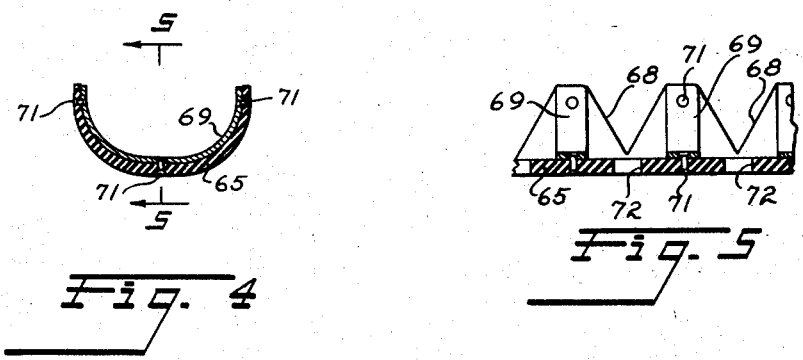
INVENTOR
ARTHUR B. WEST
BY
ATTORNEYS

2,887,343

LATERALLY INFLEXIBLE ENDLESS TRACK

Arthur B. West, Boise, Idaho

Original application September 23, 1955, Serial No. 536,165, now Patent No. 2,827,972, dated March 25, 1958. Divided and this application January 18, 1957, Serial No. 634,986

6 Claims. (Cl. 305—10)

This invention relates to vehicle track structure and particularly to an endless track structure for a low powered low speed load carrying vehicle.

The vehicle with which the track of the invention has been advantageously used comprises a load carrying platform supported by single tandem wheels running within an endless traction member, which latter is the novel track structure herein disclosed and claimed. This application is a division of co-pending application Serial No. 536,165, filed September 23, 1955, now Patent 2,827,972, entitled Load Carrying Vehicle and Track. The vehicle wheels are so mounted as to be adjustable and readily removable, and at least one wheel is driven from a power plant at the rear of the platform. At the rear of the platform arise handle bars at about waist level of the operator for steering and controlling the vehicle while walking behind it.

It is the major object of the invention to provide a novel endless track structure for a load carrying vehicle.

It is a further object of the invention to provide a novel single tandem endless ground engaging track for extending over two wheels arranged in tandem and one of which is preferably power driven.

A further object of the invention is to provide a novel endless ground engaging track structure which is longitudinally flexible and which is laterally substantially inflexible.

It is a further object of the invention to provide a novel endless ground engaging track of rubber or the like having a multiplicity of longitudinally spaced laterally rigid internal braces.

Further objects will appear as the description proceeds in connection with the annexed drawings wherein:

Figure 1 is a top plan view of a load bearing vehicle incorporating a track according to the preferred embodiment of the invention;

Figure 2, is a side elevation of the vehicle further showing the track;

Figure 3, is a front elevation of the vehicle also showing the track;

Figure 4, is a lateral section through the endless track; and

Figure 5, is a fragmentary longitudinal section on line 5—5 through the endless track.

The vehicle comprises a frame 11 upon which is secured a generally horizontal platform 12 which as shown in Figure 1 is preferably elongated longitudinally of the vehicle. A support bar 13 arises from the front end of the platform (Figure 3) extends above and extends parallel to the platform (Figure 2). At its front end it is suitably fixed to the platform or frame and is laterally braced by inclined rigid bars 14 and 15 extending from the platform corners.

The rear portion of platform 12 designated at 16 is essentially a power plant support, and just forwardly of this area spaced upright bars 17 and 18 arise from the platform and (Figure 2) curve over to provide generally horizontal but diverging (Figure 1) handle bar sections 19 and 20 respectively. The handle bars are rigidly tied together rigidly by a transverse member 21 (Figure 1) and braced by rearwardly inclined struts 22 extending between the platform corners and member 21.

At the juncture of the handle bars with the horizontal sections of bars 17 and 18 a transverse brace 23 rigidly interconnects the bars and the rear end of rod 13 turns down to be rigidly secured to brace 23 as indicated at 24. Preferably a rear panel 25 is provided vertically arising from platform 12 and extending up along bars 17 and 18 at least until they become horizontal. Panel 25, which may be an integral sheet metal extension of platform 12, separates the load carrying part of the vehicle from the power plant on area 16, and is secured to bars 17 and 18 as by screws 26.

The frame 11, platform 12, bars 13, 14, 15, 17 and 18, transverse member 21, struts 22, brace 23 and panel 25 are all rigidly and tightly secured together to mutually brace each other into a sturdy rigid assembly.

Below platform 12 two generally U-shaped depending subframes 27 and 28 are rigidly secured to, or may be parts of, the main frame 11. Subframes 27 and 28 are parallel and extend beneath opposite side edges of the platform. Each subframe (Figure 2) has a forward wheel mounting bracket 29 and a rear wheel mounting bracket 31.

Brackets 29 are aligned transversely of the frame and each is removably secured to its subframe as by bolts 32, each bracket 29 has a forwardly open slot 33 providing a bearing support for the axle 34 of front wheel 35. Suitable retainer nuts 36 limit lateral shift of axle 34 on the subframes, and the front wheel 35 is thus suitably idly mounted on the subframes.

Each laterally aligned bracket 31 has a rearwardly extending slot 37 for bearing support of opposite ends of the axle 38 of rear wheel 39 which has retainer nuts 41 like those of the front wheel. Brackets 31 are removably and adjustably secured to the subframes as by bolts 42 extending through slots 43 that permit longitudinal shift of bracket 31. A lug 44 upstands from each bracket to threadedly receive an adjustment rod 45 having a head 46 bearing on the subframe, so that when rod 45 is rotated bracket 31 shifts along its subframe and then bolts 42 are tightened to maintain the adjustment for a purpose to appear. If desired this adjustment could be provided for the front wheel brackets 29, or even for both wheels.

A sprocket 47 fixed directly on rear wheel 39 or on rear axle 38 connected by chain 48 to a sprocket (not shown) on tranverse shaft 49 which in turn carries a sprocket 51 connected by chain 52 to a sprocket (not shown) on transverse shaft 53. A clutch pulley 50 on shaft 53 is connected by belt 54 to the output shaft 55 of internal combustion engine 56. A clutch control lever 57 is suitably connected to control clutch pulley 50 and it may be latched in clutch engaged or disengaged positions in notches 58 and 59 respectively in a brace 61 connected between members 21 and 23. The engine carburetor and throttle assembly at 62 is controlled by suitable connections extending through the hollow bar 19 from rotatable handle grip 63, as in a conventional motorcycle, or a separate control may be used. The motor upper sprockets, clutch pulley etc., are all mounted on platform area 16 behind panel 25.

It will be understood that the vehicle may include any suitable power plant and drive train may be used to drive at least the rear wheel 39. The foregoing described power plant and drive reduction is used in a preferred embodiment for moving the vehicle at a slow speed corresponding to the average man's walking speed, about 3–5 miles per hour, but other drives and speeds can be introduced.

The wheels 35 and 39 which are in longitudinal alignment under the centerline of platform 12 may be the usual pneumatic tired small wheels available today on many scooters and like vehicles, and they are encompassed by an endless track unit 64 which is the ground engaging part of the drive. In its preferred embodiment track unit 64 comprises an endless belt 65 of rubber or fabric reenforced rubber having external surface corrugations 66 or formations for improved traction. Actually it has been found desirable to make up the belt of an automobile tire casing or casings cut and spliced into endless form as by vulcanizing along lines 67. Where tire casings are used the sides are notched as at 68 to enable them to flex over the small diameter wheels.

These tire casings have an imparted or inherent lateral curvature as shown in Figure 4 but in order to reenforce and maintain the transverse contour of the track to correspond to that of the tires on wheels 35 and 39 the interior of the track is provided with a multiplicity of longitudinally spaced rigid arcuate metal straps 69. These straps are secured to the belt 65 as by rivets 71, and preferably there is one rigid reenforcing strap between each notch 68. Midway between each rigid strap 69 the center of the belt is formed with apertures 72 which contribute to flexibility of the track and also aid the tractive effort of the track.

It will be appreciated that the flexible traction belt 65 need not be a tire casing but may be specially constructed, flat or laterally curved, and held to the contour of Figure 4 by riveting it to the arcuate straps 69. In a practical embodiment the straps 69 are curved to suit the cross sectional diameter of the tires on wheels 35 and 39 and are located about three and one-half inches apart along the inner periphery of the track.

In the vehicle the track 64 is adequately longitudinally flexibile to fit snugly around both wheels 35 and 39 and because of the coaction of the usual tire treads on wheels 35 and 39 with the reenforced interior of the track and the weight of the vehicle, when wheel 39 is driven from the motor it drives track 64 which in turn drives the front idler wheel 35. In making the assembly the axles 34 and 38 are placed in the corresponding oppositely facing bracket slots 33 and 37, respectively, the track is arranged about the wheels and the final adjustment of wheel axis spacing to obtain tight drive contact between the track and the wheels is made by rods 45 and located by bolts 42. This provides a flexible endless track drive that has a large area of ground engaging contact and the ability to maintain traction over rock strewn and irregular terrain. The operator merely has to walk behind with his hands on the handle bar grips whereby the vehicle is easily steered.

During assembly the belt may be connected to the normal speed pulley 50, or if a really slow speed of about one mile per hour is desired the belt may be placed on pulley 73 on shaft 53.

The vehicle is particularly useful for hunters and sportsmen who may load it into the usual automobile, it weights only about 150 pounds and that weight can be reduced by using aluminum frames and rods, and then use it to pack into otherwise inaccessible areas because it has the facility of a pack horse for carrying in supplies and carrying out game. Actually the illustrated vehicle will climb a sixty degree grade as fast as a man can follow it.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vehicle track structure comprising an elongated longitudinally flexible member that is arcuate in lateral cross-section with ground engaging traction providing formations on its convex side and a plurality of longitudinally spaced rigid arcuate transverse reenforcing straps fixed on its concave side.

2. The track structure defined in claim 1 wherein said member is endless.

3. An endless ground engaging track member for a vehicle comprising a laterally arcuate endless traction belt of rubber, rubber and fabric or the like, and a plurality of fixed arcuate rigid metal transverse reenforcing braces longitudinally spaced all along the concave inner surface of said belt.

4. In the track member defined in claim 3, said belt being apertured between adjacent braces.

5. In the track member defined in claim 3, said belt having opposite side wall edge notches between adjacent braces for increased longitudinal flexibility.

6. An endless track structure for load carrying vehicles comprising an endless longitudinally flexible, laterally inflexible member having the normal shape of an elongated substantally straight sided loop with rounded wheel containing ends, said member being arcuate in cross-section and having its laterally convex outer surface formed with ground engaging traction providing formations, the inner concave surface of said member being formed to receive vehicle wheels at said ends, a plurality of spaced rigid arcuate straps secured upon and along said inner concave surface, and a plurality of side wall edge recesses in said member disposed between adjacent straps.

References Cited in the file of this patent

UNITED STATES PATENTS

| | | |
|---|---|---|
| 1,634,589 | Lotte | July 5, 1927 |
| 2,055,932 | Kitchen | Sept. 29, 1936 |
| 2,376,802 | Morse | May 22, 1945 |

FOREIGN PATENTS

| | | |
|---|---|---|
| 802,951 | France | Mar. 4, 1936 |
| 283,628 | Switzerland | Oct. 16, 1952 |